(12) United States Patent
Ng

(10) Patent No.: US 6,285,633 B1
(45) Date of Patent: Sep. 4, 2001

(54) MULTIPLE DISC CHANGING APPARATUS

(75) Inventor: Wing Ho Ng, Hong Kong (HK)

(73) Assignee: Glory Horse Industries Limited, New Territories (HK)

( * ) Notice: Subject to any disclaimer, the term of this patent is extended or adjusted under 35 U.S.C. 154(b) by 0 days.

(21) Appl. No.: 09/289,749

(22) Filed: Apr. 12, 1999

(51) Int. Cl.[7] ................................................ G11B 17/22
(52) U.S. Cl. ............................................................. 369/37
(58) Field of Search ................................. 369/37, 36, 178

(56) References Cited

U.S. PATENT DOCUMENTS

| | | | |
|---|---|---|---|
| 5,123,005 | 6/1992 | Kurosu | 369/77.1 |
| 5,386,403 | 1/1995 | Morioka et al. | 369/39 |
| 5,771,213 | * 6/1998 | Koshino et al. | 369/37 |
| 5,892,737 | * 4/1999 | Park | 360/37 |
| 5,943,306 | * 8/1999 | Silverstein | 369/37 |
| 6,064,636 | * 5/2000 | Leung | 369/37 |

FOREIGN PATENT DOCUMENTS

4121297A1    1/1992   (DE) .

* cited by examiner

Primary Examiner—Allen T. Cao
(74) Attorney, Agent, or Firm—Jacobson, Price, Holman & Stern, PLLC

(57) ABSTRACT

A multiple compact disc player, particularly although not necessarily solely, directed towards an audio compact disc player. The turntable for supporting two or more compact discs is provided with connected or associated releasable clamps to engage the compact discs onto the turntable when in the out-of-play position. The clamps are released once an adjacent compact disc is engaged by the drive spindle of the reading unit to allow the compact disc to be positioned appropriately for play. The provision of the clamps allows the turntable, reading unit and disc player as a whole to be oriented in positions other than the horizontal including a substantially vertical orientation if desired. Furthermore, the reading unit itself undergoes linear transverse motion with respect to the general plane of the turntable for easier engagement with the compact disc on the turntable.

7 Claims, 3 Drawing Sheets

MULTIPLE DISC CHANGING APPARATUS

FIELD OF THE INVENTION

This application relates to a multiple disc changing apparatus and, in particular, although not necessarily solely, a multiple disc turntable for audio, video or computer applications. Generally, the apparatus will be described with reference to audio compact disc players although the invention can be applied to other apparatus.

BACKGROUND

Compact disc players have existed for some years. Initially, the compact disc players utilized a single disc that could be mounted and removed from the unit as desired.

In more recent times, a relatively standard feature on audio equipment has been turntables to accommodate multiple compact discs so that the turntable may selectively rotate one of the discs into a playing position.

A common form of multiple compact disc turntable utilizes recesses to position the discs themselves on the turntable. When the desired disc is rotated into the play position, the drive and reading unit of the compact disc player engages the disc, lifts the disc from the turntable into position where it may be rotated and plays the disc.

The difficulty with such conventional apparatus is that the units must be maintained in a relatively stable horizontal position to avoid any dislodgement of the discs when in the out-of-play positions which may cause both damage to the disc as well as causing the disc to be improperly placed if rotated to the in-play position. The discs are generally supported laterally in the recess and supported underneath by the turntable itself. However, there is no retention of the disc within the recess other than that provided by gravity.

To add greater flexibility in the design of audio equipment, recent developments have included compact disc players which can be arranged in the vertical position. However, these arrangements have generally been restricted to players capable of retaining only a single compact disc. A typical example of such an apparatus securely fixes the disc onto the drive spindle so that, even in the vertical position, the disc is securely held. The securing of the discs in this position has involved such apparatus as retaining means on the spindle itself in the form of spring biased ball bearings protruding from the spindle. The compact disc is fitted over the spindle and pushed past the ball bearings which must recess into the spindle to allow the compact disc to be fitted in place. The spring bias then causes the ball bearings to protrude on the far side of the compact disc from the seat provided on the drive spindle.

Although such an arrangement is suitable for a single compact disc, it does not accommodate a multiple compact disc turntable which requires an easier fixing and release of the compact disc in the in-play position as well as the need to securely support the compact discs in the out-of-play positions.

OBJECT OF THE INVENTION

It is an object of the present invention to provide a multiple disc changing apparatus that overcomes some of the disadvantages of the prior art to allow non-horizontal orientation of the turntable while supporting the discs in both the in-play and out-of play positions. It is at least an object of the present invention to provide a multiple disc changing apparatus which provides the public with a useful choice.

SUMMARY OF THE INVENTION

Accordingly, in the first aspect, the invention may broadly be said to consist in a multiple compact disc player including:

a rotatable support means for the support of at least two compact discs in selected positions;

a reading unit to engage and retrieve information from a compact disc;

a drive means to rotate said rotatable support means such that a selected compact disc may be placed in a position to engage said reading unit; and an engagement means on or in association with said rotatable support means to retain said compact discs not engaged by said reading unit in said selected positions on said rotatable support means.

Accordingly, in a second aspect, the invention may broadly be said to consist in a rotatable support means for a compact disc player having a reading unit to retrieve information from a compact disc including:

a rotatable support means having at least two positions for placement of compact discs; and releasable engagement means to retain said compact discs in said selected positions and selectively release a compact disc when said compact disc is engaged by said reading unit of said compact disc player.

Further aspects of the invention may become apparent to those skill in the art to which the invention relates by reading the following description.

BRIEF DESCRIPTION OF THE DRAWINGS

A preferred embodiment of the invention will now be described with reference to the following drawings in which.

DETAILED DESCRIPTION OF PREFERRED EMBODIMENTS

Figure 1:
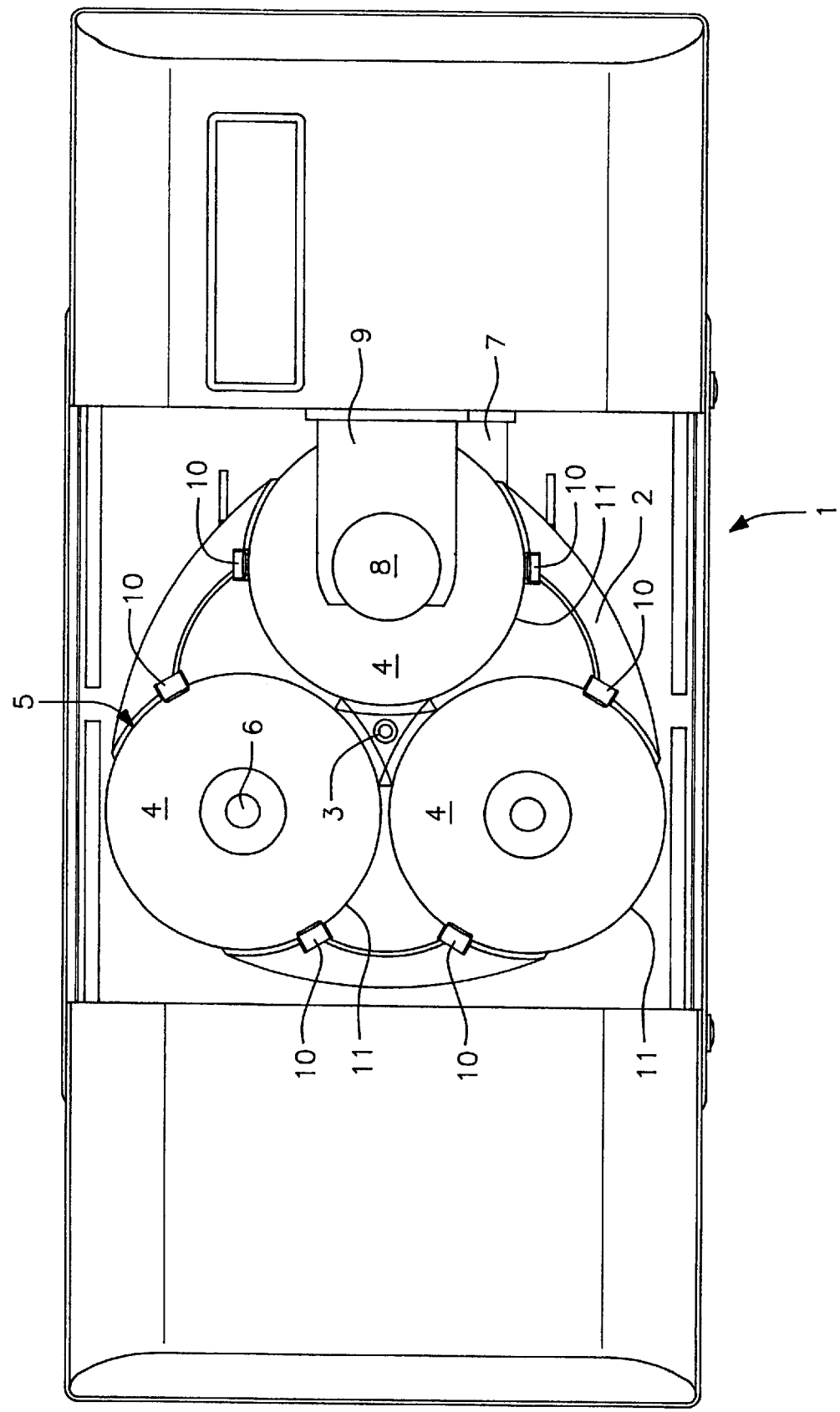
FIG. 1 shows an elevation view of a preferred embodiment of the apparatus.

This invention relates to a multiple compact disc player 1, a preferred embodiment of which is shown in FIG. 1. The preferred embodiment described is for an audio compact disc player. However, an essentially the same compact discs may be used for video compact disc players, computer disc drives and other such apparatus, the invention may be applied whenever suitable.

The multiple compact disc player 1 as shown in FIG. 1 has a rotatable support means 2 in the form of a turntable rotatable about a central axis 3. A plurality of compact discs 4 may be placed on the rotatable support means 2 in selected positions. Generally, the selected positions will be defined by means of recesses 5 into the generally planar turntable 2 so that the discs 4 are supported in the plane of the turntable 2 by the edges of the recess 5. Alternative means can be used to define the selected positions provided these means are capable of retaining the discs 4 in a position relative to the rotatable support means 2. For example, a series of projections from the turntable 2 around the outer edge of the compact disc 4 could be utilized. Generally, the discs 4 will not be supported by their central aperture 6 while on the turntable 2 as this aperture is generally left clear for engagement of a drive and reading unit 7.

A driving and reading unit 7 is provided to engage the compact disc 4 once positioned adjacent the unit 7. In this embodiment, the driving and reading unit 7 works in co-operation with the top support 8. The unit 7 contains a drive spindle which engages an adjacent compact disc 4, lifts the disc from the turntable or rotatable support means 2 and rotates the disc 4 to be read by the information retrieval means contained on the unit 7. The top support 8 may comprise a magnetic top plate which is loosely supported in an upper arm 9. The top magnetic support is magnetically attracted to the seat for the compact disc provided on the drive spindle of the reading unit 7. This sandwiches the compact disc 4 between the paramagnetic and the seat on the spindle to avoid eccentric rotation and slippage of the compact disc on the seat of the drive spindle.

It should be noted that in this particular embodiment, three compact discs 4 may be accommodated in selected positions on the turntable 2. Upon receiving an indication from a control means (not shown), compact disc 4 can be released by the reading unit 7 to reside on the rotatable support means 2, the rotatable support means 2 rotated to bring a further compact disc 4 adjacent reading unit 7 and the reading unit 7 engage the further compact disc as desired. The particular number of selected positions or compact discs provided on the turntable dose not affect the invention although there would be no need for the rotatable feature unless at least two compact discs can be accommodated.

The preferred embodiment thus far does not differ from existing multiple compact disc players and rotatable turntables provided on such players. However, in this embodiment, releasable engagement means 10 are provided around the perimeter of each of the selected positions on the rotatable support means 2. The engagement means 10 engaged partially over an outer edge 11 of the compact discs 4 so that the compact disc 4 is not only supported in plane with the turntable 2 by the recess 5 but also engaged or retained on the turntable 2 by the engagement means 10. This engagement means allows the multiple compact disc player 1 or at least the rotatable support means 2 to be oriented in positions other than the horizontal including a vertical position without the discs 4 becoming dislodged from the rotatable turntable 2.

The engagement means 10 can be provided in a variety of manners although this preferred embodiment provides the engagement means at least a pair of opposed engagement means overlapping the outer edge 11 of the disc 4. Alternative configurations or forms of the engagement means 10 may be provided.

It can be noted from FIG. 1 that the pair of engagement means 10 adjacent the compact disc 4 currently engaged with the reading unit 7 are withdrawn and spaced apart from the outer edge 11 of the disc 4. To read the compact disc 4, the reading unit lifts the compact disc from the turntable 2 so that it may be freely rotated according to the requirements of the reading unit 7 and under the control of a drive spindle associated with the reading unit 7 and not contact the turntable 2 so as to interfere with that operation. On that basis, the engagement means 10 is provided in a releasable manner to release the compact disc 11 once engaged by the drive spindle and reading unit 7.

FIGS. 2 through 5 show the turntable 2, reading unit 7 and associated apparatus in considerably more detail. This particular preferred embodiment shown in these figures is the same as that previously described for FIG. 1.

Figure 2:
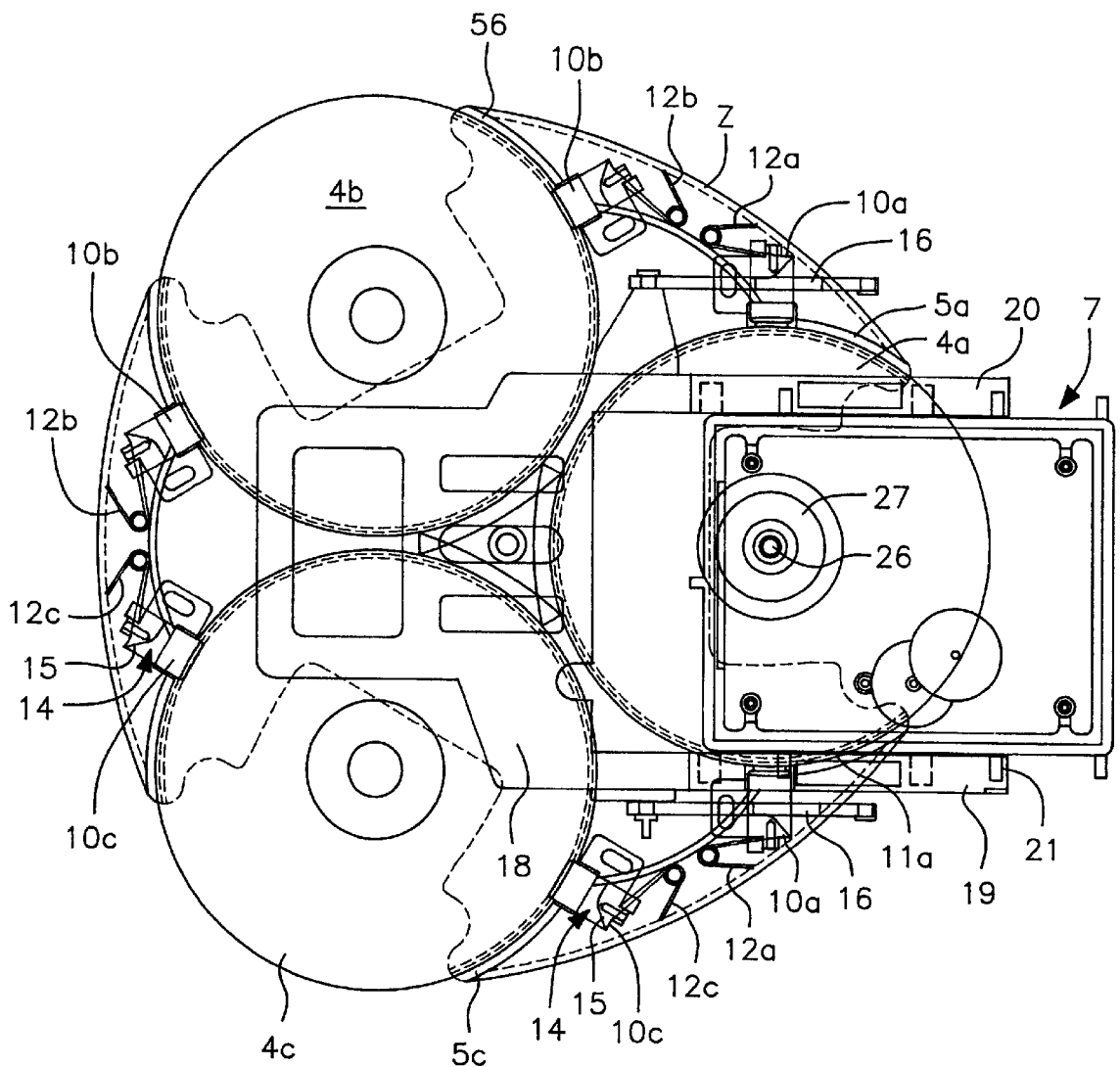
FIG. 2 shows a plan view of a portion of the apparatus of FIG. 1 in a first configuration.
Figure 3:
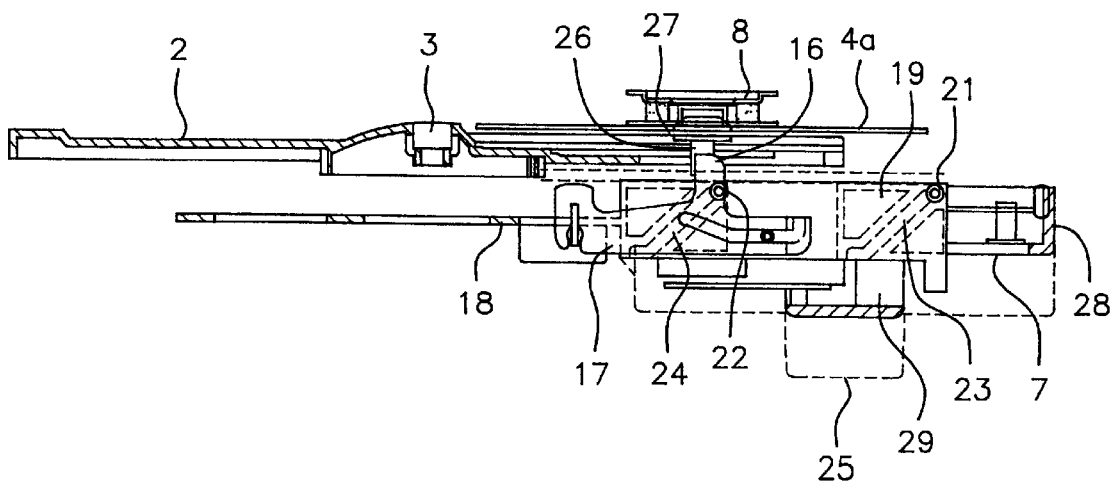
FIG. 3 shows an elevation view of the portion of FIG. 2 in said first configuration.
Figure 4:
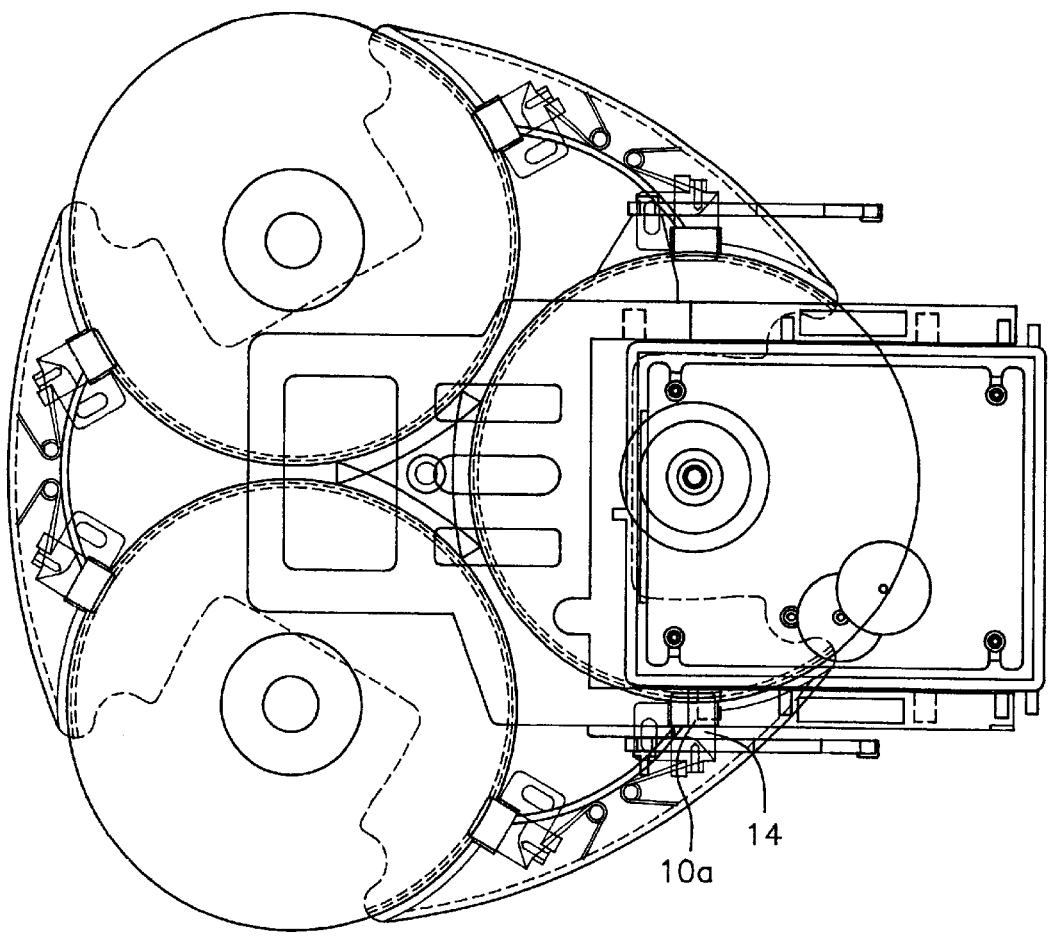
FIG. 4 shows a plan view of the portion of the apparatus of FIG. 2 in a second configuration.

FIGS. 2 and 3 show the preferred embodiment in a first configuration. This first configuration is the same as that shown in FIG. 1 in which a compact disc adjacent the reading unit is currently engaged with the reading unit. FIGS. 3 and 4 are directed to the same preferred embodiment in a second configuration as the adjacent compact disc is released by the reading unit and re-engaged by its associated engagement means.

Turning firstly to FIGS. 2 and 3, the rotatable support means 2 can be seen to support three compact discs, 4a, 4b and 4c. Each of the compact discs, 4a, 4b and 4c is supported in a selected position 5a, 5b and 5c in the form of a recess of slightly larger diameter than the diameter of the compact discs.

As explained previously, each selected position and compact disc has a pair of engagement means 10a, 10b and 10c. Furthermore, each of those engagement means are biased into the engaged position with the associated compact discs by biasing means 12a, 12b and 12c. The biasing means of this preferred embodiment are steel springs and as the engaged position for the engagement means 10a, 10b and 10c is required in a plurality of positions to which the turntable may be rotated and the unengaged position currently defined by engagement means 10a is only required when the disc is adjacent the reading unit 7, it is preferred that the bias on the engagement means is oriented to bias this into engagement and the bias is only overcome in the position adjacent the reading unit. The alternative construction of biasing these engagement means to the unengaged position when adjacent the reading unit and manoeuvring the items against that bias in all other positions is a possible, although less desirable, option.

Referring to the engagement means 10c, it can be seen that each of the pair of engagement means is provided with a slot 14 which has an angled face 15 defining a broader opening to the slot 14 towards the perimeter of the turntable 2 than the interior end of the engagement means 10c. This angled face 15 may act as a cam when engaging a sliding projection 16 provided on either side of the reading unit 7. The numerals 14 and 15 have been omitted from the other engagement means 10a and 10b for clarity although identical slots and angled faces are provided on those as well.

As can be seen on engagement means 10a, the projection 16 can slide and engage within the slot 14 to retain the engagement means 10a in a position in which the engagement means is spaced from the outer perimeter 11a of the compact disc 4a. The angled or cam face 15 assists as the projection 16 slides into the slot 14 from the outer perimeter of the turntable 2.

The sliding position 16 will engage the outer edge of the cam face 15 and while moving in a linear direction, cause transverse motion of the corresponding engaging means to withdraw the engaging means from engagement with the compact disc. Clearly, the sliding projection can be provided to work from the general direction of the interior of the turntable towards the exterior by reversing the direction of the slot 14 and cam face 15 on the engagement means 10. It is merely considered preferable to arrange the components in the manner as shown in this embodiment.

Referring to FIG. 3, the sliding projection 16 is attached to an arm 17 or other suitable drive means which itself is connected to a sliding plate 18. The sliding plate 18 has side plates 19 and 20 which extend either side of the reading unit 7. Support for the reading unit 17 is provided by engagement of pins 21 and 22 as shown in FIG. 2 into side plate 19 and similar projections into side plate 20 on the other side of the reading unit 7.

The pins or other suitable engagement means 21 and 22 are contained within angle slots 23 and 24 on side plate 19. Further, the reading unit 7 is retained by a housing or similar (not shown) so that the only free movement available to the reading unit 7 is substantially transverse to the plane of the compact disc 4a or the general plane of the turntable 2. In FIG. 3, the reading unit 7 moves in a vertical position to the limit of travel indicated by dash line 25 on FIG. 3.

Again referring to FIG. 3, to be seen that the reading unit 7 is provided with a drive spindle 26 which is engaged through the compact disc 4a such that an extending flange 27 acts as a seat for the compact disc 4a. The substantially transverse movement of the reading unit 7 with respect to the general plane of the turntable 2 between the first and second configuration causes the drive spindle 26 to engage through the central aperture of the compact disc 4a. The seat 27 lifts the compact disc from its recess in the turntable 2 so that it may be rotated freely under control from the drive spindle 26. The magnetic top support 8 is also shown in FIG. 3 and is magnetically attracted to the seat 27 to sandwich the compact disc 4a therebetween.

It should be noted that, although this preferred embodiment utilizes a linear motion of the reading unit 7, other conventional apparatus for substantially horizontal applications utilizes a rotational motion of the reading unit 7 to engage the compact disc. Typically, such an arrangement hinges one edge of the reading unit 7 such as the edge 28 in FIG. 3. The hinged edge 28 will remain fixed but rotatably attached to a suitable mounting and the distal free edge of the reading unit 7 is raised and lowered to rotate about a hinge on edge 28. Such rotational movement is considered less desirable for the present application.

The reading unit 7 is provided with drive means in the form of a motor 29 or similar apparatus to cause rotation of the drive spindle 26 as well as an optical reading unit to read the disc.

Figure 5:
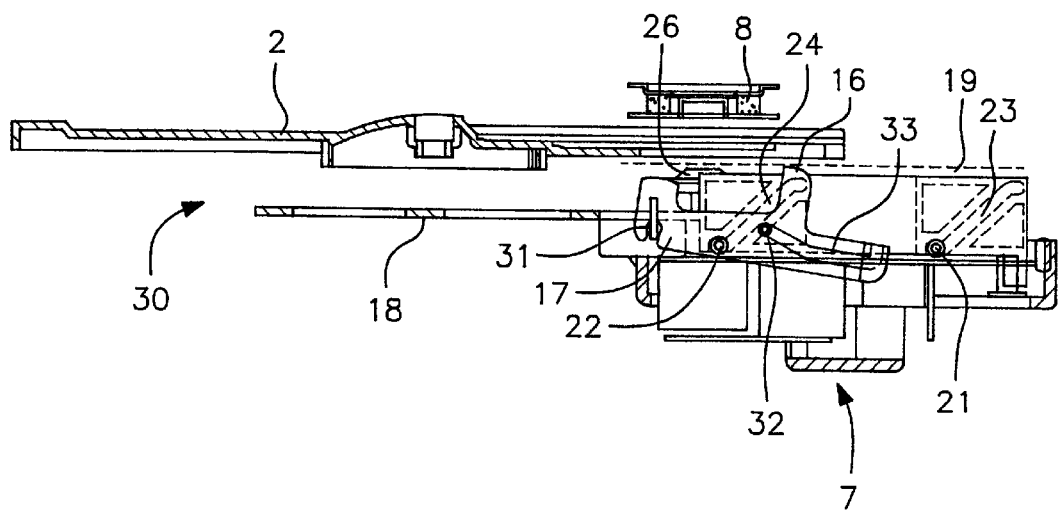
FIG. 5 shows an elevation view of the portion of the apparatus of FIG. 4 in said second configuration.

By reference to corresponding FIGS. 2 and 4 as well as corresponding FIGS. 3 and 5, the relative positions of the various items when the reading unit 7 is engaged or disengaged with the compact disc 4a can be seen. In fact, in FIG. 5, the compact disc 4a has been omitted for clarity.

In FIGS. 4 and 5, the sliding member 18 has moved laterally substantially in plane with the general plane of the turntable 2. This is generally in the direction of the arrow 30 in FIG. 5.

It can be seen that this movement causes a corresponding movement of the side plates 19 and 20 and through the provision of the angled slots 23 and 24, the support pins 21 and 22 are driven to a more distant position from the turntable 2. It is this motion which drives the lowering of the reading unit 7 such that the drive spindle 26 is now beneath the turntable 2 and disengaged from any compact disc that may be adjacent the reading unit 7. The compact disc (not shown in FIG. 5) will have returned to its supported position on the turntable 2. The upper support 8 is also free of the disc and the turntable is ready for rotation to bring a further selected disc adjacent the reading unit 7.

The arm 17 has been moved laterally with the sliding member 18 due to the connection 31 therebetween. A pin or other guide means 32 supported from an adjacent stationary portion such as the housing of the compact disc player can be engaged within a co-operating slot 33 such that the sliding projection is not only moved out of the adjacent slot 14 in the engagement means 10a but also lowered through the provision of the angled faces in the slot 33. The lowering of the projection 16 assists in removing the projection 16 from interfering with rotation of the turntable 2.

It can be seen that the initial movement of the arm 17 from the position in FIG. 3 to the position shown in FIG. 5 is a generally lateral motion courtesy of the initial portion of slot 33 being substantially parallel to the sliding member 18. This ensures that the projection 16 engages and disengages along the length of the slot 14 and cam face 15 to cause a gradual movement of the engagement means 10a. Once free from the slot 14 and the engagement means 10a, the latter part of slot 33 contains the angled faces to draw the projection 16 away from the plane of the turntable 2.

It can be seen that connection 31 between the arm and the sliding member 18 is a pivotal connection to support this movement of the arm 17.

By providing the arm 17 in direct engagement with the sliding member 18 which itself directly engages the reading unit 7, it is possible to time the engagement and release of the engagement means 10a with movement of the reading unit 7. This is highly desirable for this preferred embodiment to allow orientation in a substantially vertical position as it ensures that the engagement of the compact disc 4a can occur just as the compact disc 4a has been lowered onto its seat on the turntable 2 and the drive spindle 26 commences to disengage from the compact disc 4a. The compact disc 4a is essentially supported by either the drive spindle 26 or the engagement means 10a throughout the cycle of movement.

The sliding member 18 can be driven through its movement by a suitable drive mechanism of its own or, driven from the same drive means that causes rotation of the turntable 2. The drive mechanism needs to accommodate no rotation of the turntable 2 while the sliding member 18 is moved after which rotation of the turntable can then occur.

Thus it can be seen that the invention provides a multiple disc compact disc player or at least a turntable and associated engagement means which allow the substantially vertical orientation of the turntable 2. The compact discs are retained in place in the out-of-play position by engagement means 10 and, once engaged by the drive spindle 26, a timed release of the engagement means 10 occurs to release only that compact disc so engaged by the drive spindle 26. The disc may then be positioned relative to the reading unit 7 for retrieval of the information contained on the disc.

It can also be seen that the reading unit 7 moves in a substantially linear fashion rather than rotationally about a hinged edge to provide more accurate and better placement of the drive spindle 26 on the compact disc. This is particularly advantageous when co-operating with the engagement means 10 to cause timed release of the compact disc.

The preferred embodiments of this invention have been described to illustrate the invention although should not be considered limiting to the scope of the invention as defined by the appended claims. Integers referred to in the description are deemed to incorporate known equivalents where appropriate and alternative constructions to the preferred embodiments can be envisaged by those skill in the art. Furthermore, references to the singular may be considered to refer to the plural where appropriate.

What is claimed is:

1. A multiple compact disc player including:
   a rotatable support means having at least two substantially coplanar positions for placement of compact discs;
   a reading unit to engage and retrieve information from a compact disc;

a drive means to rotate said rotatable support means such that a selected compact disc is placed in a position to engage said reading unit; and an engagement means on or in association with said rotatable support means to retain said compact discs not engaged by said reading unit in said selected positions on said rotatable support means.

2. A multiple compact disc player as claimed in claim 1 wherein said engagement means comprise at least one engagement member positioned around a periphery of said selected positions and movable between an engaged and a disengaged position.

3. A multiple compact disc player as claimed in claim 2 wherein said engagement means are moved between said engaged and disengaged positions by a drive means interconnected with said reading unit such that movement of said reading unit to an engaged position with said compact disc creates a disengagement of said engagement means.

4. A multiple compact disc player as claimed in claim 1 wherein said reading unit engages said compact disc through substantially transverse motion of said reading unit with respect to a plane of said rotatable support means.

5. A multiple compact disc player as claimed in claim 1 wherein said rotatable support means comprises a turntable to support a plurality of compact discs in selected positions.

6. A rotatable support means for a compact disc player having a reading unit to retrieve information from a compact disc including:

a rotatable support means having at least two substantially coplanar positions for placement of compact discs; and releasable engagement means to retain said compact discs in said selected positions and selectively release a compact disc when said compact disc is engaged by said reading unit of said compact disc player.

7. A multiple compact disc player including:

a rotatable support means for the support of at least two compact discs in selected positions;

a reading unit to engage and retrieve information from a compact disc;

a drive means to rotate said rotatable support means such that a selected compact disc is placed in a position to engage said reading unit; and an engagement means on or in association with said rotatable support means to retain said compact discs not engaged by said reading unit in said selected positions on said rotatable support means, said engagement means comprise at least one engagement member positioned around a periphery of said selected positions and movable between an engaged and a disengaged position, said engagement means being moved between said engaged and disengaged positions by a drive means interconnected with said reading unit such that movement of said reading unit to an engaged position with said compact disc creates a disengagement of said engagement means.

* * * * *